United States Patent [19]
Norton

[11] Patent Number: 4,787,603
[45] Date of Patent: Nov. 29, 1988

[54] RELOCATABLE GRAZING YARDS

[76] Inventor: Clive N. Norton, P.O. Box 111, Wallan Vic., Australia

[21] Appl. No.: 139,606

[22] Filed: Dec. 30, 1987

Related U.S. Application Data

[63] Continuation of Ser. No. 903,236, Sep. 3, 1986, abandoned.

[30] Foreign Application Priority Data

Sep. 5, 1985 [AU] Australia .................. PH2290

[51] Int. Cl.[4] .............. E04H 17/16; E04H 17/14; E04H 17/18; A01K 3/00
[52] U.S. Cl. .......................... 256/25; 256/1; 256/31; 256/47; 256/73; 119/20
[58] Field of Search ............ 256/24, 25, 29, 30, 256/31, 1, 73, DIG. 6, 19, 32, 47, 59, 66, 65; 119/20

[56] References Cited

U.S. PATENT DOCUMENTS

| | | | |
|---|---|---|---|
| 569,174 | 10/1896 | Cook | 256/31 |
| 2,637,934 | 5/1953 | Manoil | 256/24 X |
| 3,020,023 | 2/1962 | MacIntyre et al. | 256/25 X |
| 3,350,066 | 10/1967 | Cope | 256/47 X |
| 3,387,825 | 6/1968 | Kreeger | 256/47 |
| 3,469,822 | 9/1969 | O'Brien | 256/25 |
| 3,740,022 | 6/1973 | DiGiovanni | 256/65 X |
| 3,776,521 | 12/1973 | Weinert | 256/24 |
| 3,891,189 | 6/1975 | Russo | 256/1 |
| 4,341,181 | 7/1982 | Fair | 119/20 |
| 4,349,989 | 9/1982 | Snider, Jr. | 256/32 X |
| 4,508,060 | 4/1985 | Schulte | 119/20 X |

FOREIGN PATENT DOCUMENTS

| | | | |
|---|---|---|---|
| 1507091 | 10/1969 | Fed. Rep. of Germany | 119/20 |
| 3304186 | 9/1984 | Fed. Rep. of Germany | 256/32 |
| 119449 | 4/1958 | New Zealand . | |
| 118943 | 4/1958 | New Zealand . | |

OTHER PUBLICATIONS

Moving Your Range Fence Can Be Easy, Turkey World, Jun. 1954, by Charles and Dorthy Miller, pp. 12, 13 and 26.

Primary Examiner—Randolph A. Reese
Assistant Examiner—John A. Ricci
Attorney, Agent, or Firm—Merchant, Gould, Smith, Edell, Welter & Schmidt

[57] ABSTRACT

A relocatable grazing enclosure suitable for grazing farm animals such as dairy calves or kids. The enclosure comprises a plurality of wall units each of which includes at least one leg member. The enclosure also comprises a plurality of base units, each base unit including at least one recess for receiving a leg member of a wall unit. The wall units are arranged to form the enclosure.

27 Claims, 3 Drawing Sheets

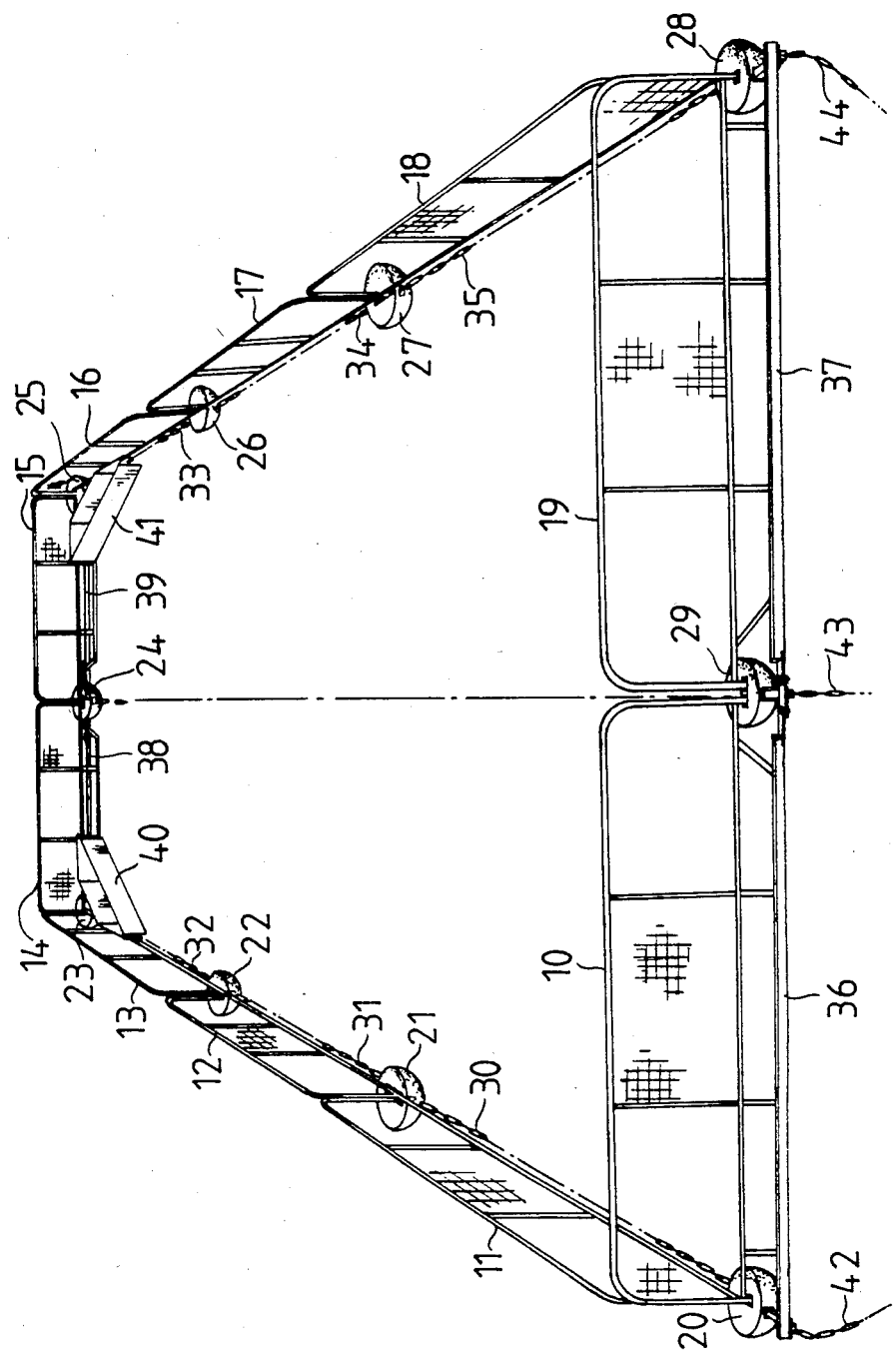

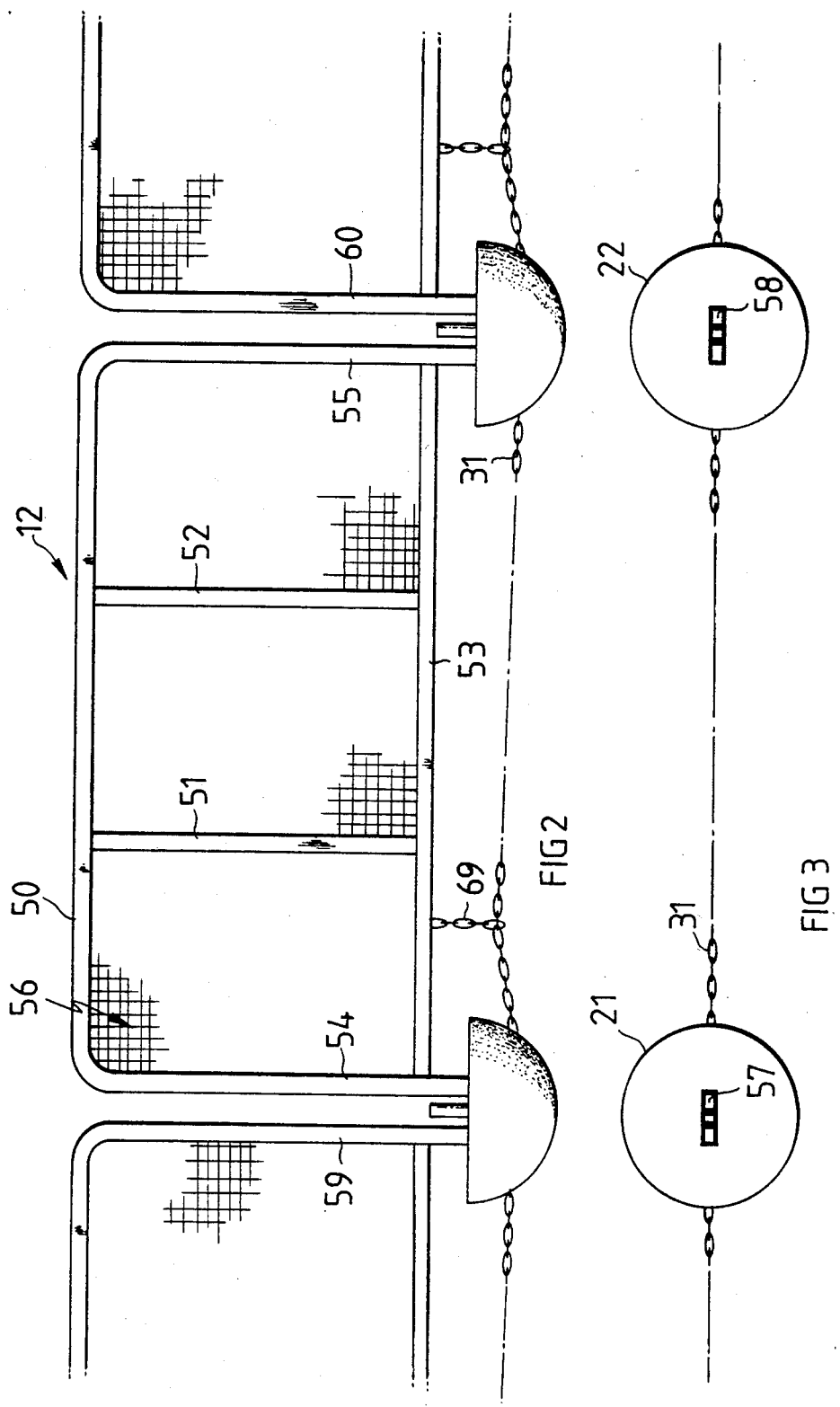

RELOCATABLE GRAZING YARDS

This is a continuation, of application Ser. No. 903,236, filed 9/3/86, abandoned.

BACKGROUND OF THE INVENTION

The present invention relates to grazing yards suitable for grazing farm animals such as dairy calves or kids. In particular, the present invention concerns such grazing yards which may be readily moveable or relocatable.

Prior art calf yards generally comprise large sheds and/or enclosures. These may contain 100-200 calves at a time. Keeping so many animals in one place gives rise to particular problems such as pollution and additionally presents difficulties in maintaining healthy conditions. If housed in sheds the animals have to be put out to pasture at regular intervals. If housed in enclosures the ground quickly becomes trodden and soiled and the animals must be put to pasture if they are to graze on clean ground.

SUMMARY OF THE INVENTION

The grazing yard of the present invention is adapted to be readily relocatable eg. on a daily basis, so that the animals always have fresh clean ground to graze on. The animals thus have clean healthy grazing conditions and a relatively pollution free environment. Frequent relocation has additional benefits in that the ground is able to recover quickly for reuse.

The grazing yard of the present invention preferably is modular in construction. In one form, the grazing yard may comprise a plurality of modular sub-units. The modular sub-units may be interconnected as desired, thus permitting grazing yards of any convenient shape and/or size to be readily constructed. Modular construction should also facilitate economical manufacture.

The grazing yard of the present invention includes a plurality of wall units. The wall units preferably are interconnected such that they can be moveable or relocatable as an assembly.

Each wall unit may include a frame member. The frame member preferably includes a pair of vertical elements. The frame member may include at least one horizontal element. In one form the frame member may include an inverted U having a pair of leg members. Each wall unit may include at least a further horizontal element. The further horizontal element may be located adjacent a lower portion of the wall unit. Each wall unit may include further vertical elements. The further vertical elements may be located between leg members. The frame member may be formed from tubular material. The tubular material preferably comprises metal. The tubular material may be rectangular in cross-section or any other suitable cross-section. Particularly economical construction may be achieved with tubular material of circular cross-section. At least one wall unit preferably includes a gate eg. between a pair of vertical elements.

Each wall unit may include a skirt member. The skirt member may be adapted to extend from a lowermost portion of a frame member substantially adjacent ground level to reduce clearance therebetween. A skirt member preferably is provided at least on the leading and trailing wall units. In one form the or each skirt member may be pivotably or swingably mounted on the wall unit to minimize fouling during relocation. The degree of pivoting preferably is limited to ensure that smaller animals do not exit via the skirt member.

Each wall unit may include a barrier element. In one form the barrier element may comprise steel mesh or 'chicken' wire. The barrier element may include wind proofing if desired. The barrier element may be attached to the frame member in any suitable manner e.g. the barrier element may be spot welded or it may be bound to the frame member by means of metal wire. Each wall unit may be formed in any convenient size and/or shape. Preferably, the wall units are substantially rectangular in outline. In one form each wall unit be substantially one meter high and 4.3 meters wide.

The grazing yard of the present invention includes a plurality of base units. The base units may be coupled or attached to the leg members of a wall unit to maintain the wall units in a substantially vertical position. The base members preferably are non-rigidly flexibly coupled to the leg members so as to permit at least a degree of movement or pivoting between a leg member and base unit in the plane of the wall unit. Each base unit may include a vertical recess or slot for receiving at least one leg member of a corresponding wall unit. The recess or slot preferably is formed so as to permit movement or pivoting in the plane of the wall unit between a leg member and its base unit.

The mouth of the recess or slot preferably is rectangular in shape. The long side walls of the recess i.e. those running parallel to the wall units may be substantially parallel. The distance between the long side walls may be substantially equal to the width of a corresponding leg member. The long side walls preferably extend in a substantially vertical direction when the base unit is placed on the ground.

The short side walls of the recess i.e. those joining the long side walls preferably are spaced sufficiently to permit the abovementioned movement or pivoting of a leg member relative to the base unit. Such lateral movement or pivoting accomodates relative movement of the wall units during relocation. The latter feature is of assistance when the grazing yard is being moved over an uneven surface.

The short side walls of the recess may be parallel or they may flare outwardly from a minimum cross-section within the base unit to a maximum cross-section at the mouth of the recess. The minimum cross-section preferably is dimensionally similar to the cross-section of a pair of leg members when place side by side.

In the case of corner base units the abovementioned short side walls of the recess may be parallel and more closely spaced so that little or no movement of corner leg members takes place. In other words, the distance between the short side walls may be twice the distance between the long side walls of the recess or slot. This may ensure that a pair of corner leg members may be received in the slot or recess side by side with minimum front-to-back and side-to-side movement.

The base units may be formed of any suitable material. The material of construction preferably is sufficiently dense so that base units of adequate mass can be constructed within relatively compact dimensions. In one form the base units may comprise concrete. The base units may be cast in any convenient shape or configuration. Preferably the base units include substantially a smooth lower surface so that they may slide over the ground with minimum resistance. Alternatively, the lower surface may include elements capable of rolling, such as wheels or rollers.

In one form the base units may be substantially circular in horizontal cross-section. The base units preferably have sufficient mass to maintain the wall units in a substantially upright position. The base units may include curved side walls to enhance self-righting capability of the base units eg. in the event that a wall unit has front-to-back or side-to-side pressure applied to it.

Conveniently, a pair of base units may be associated with each wall unit. The base units preferably are spaced such that they are located substantially at the ends of a wall unit.

The wall units may be used to construct a grazing yard of any convenient shape and/or dimensions. In one form a substantially rectangular grazing yard may be formed which is two wall units wide and three wall units long. This would require ten wall units in all.

The base units preferably are interconnected to minimize strain on the wall units, particularly during relocation. In one form the base units may be interconnected via a flexible link such as a metal chain. A further interconnection such as by means of metal chain may be provided between the tops of adjacent wall units.

To minimize stress on wall units the base units may be further interconnected via one or more rigid members. The or each rigid member preferably comprises light weight material such as timber.

Relocation of the grazing yard may be performed with the aid of a prime mover such as a tractor. A rigid towing beam or bar member may be attached to a short side of the grazing yard. Preferably, the rigid towing beam is attached to the base units of the grazing yard. The rigid beam may be permanently attached to the grazing yard. Alternatively, the rigid beam may be secured to the base units prior to relocation being carried out. The rigid beam may be subsequently attached to a tractor via towing lines for towing to a fresh location. In one form a pair of towing beams or bar members may be provided, one each on the leading and trailing end of the grazing yard respectively. The towing beam not in use may be secured to the base or wall units by means of clips or chains.

With wider grazing yards two or more towing beams may be used in tandem at each end of the grazing yard. To reduce the tendency for the sides of the grazing yard to fold together during relocation the clips or chains located in the middle of the towing beams may be a little shorter than the outer clips or chains. The pull on the leading sides of the grazing yards should thus be a little ahead of the middle of the yard.

The grazing yard of the present invention may include an optional shelter unit. The shelter unit may be constructed in any suitable manner. The shelter unit preferably includes a floor and a roof section. The shelter unit preferably also includes three fixed walls. The shelter unit may be located at one end of the grazing yard. The shelter unit may be used to replace a pair of wall units, for example at a short side of the grazing yard.

The shelter unit may be attached to the grazing yard in any suitable manner. The shelter unit may be detachable from the grazing yard for separate towing or it may be towed with the grazing yard. In the latter case, towing lines may be attached directly to the shelter unit. The rigid towing beam also may be dispensed with. The shelter unit may include wheels or other means permitting easy relocation of the shelter unit. The shelter unit may optionally include a feeding station along one wall thereof. A pair of shelter units could be provided, alternatively one at each end of the grazing yard.

A feed receptacle could be prepared (cleaned and filled) in a preparing area and delivered to the grazing yard. The feed receptacle may be of any suitable design e.g. circular. The receptacle may be lowered into the grazing yard by means of a tractor.

According to one aspect of the present invention there is provided a wall unit suitable for use with a relocatable enclosure including a plurality of base units, said wall unit including at least one leg member adapted to be received by a base unit such that said wall unit is maintained in a substantially vertical position.

According to a further aspect of the present invention there is provided a base unit suitable for use with a relocatable enclosure including a plurality of wall units said base unit being adapted to receive a leg member of a wall unit and being adapted to maintain said wall unit is a substantially vertical position.

According to a still further aspect of the present invention there is a relocatable enclosure comprising:
  a plurality of wall units, each wall unit including at least one leg member,
  a plurality of base units, each base unit including at least one recess for receiving a leg member of a wall unit,
said wall units being arranged to form said enclosure.

BRIEF DESCRIPTION OF THE DRAWINGS

A preferred embodiment of the present invention will now be described with reference to the accompanying drawings wherein:

FIG. 1 shows an erected grazing yard according to a preferred embodiment of the present invention;

FIG. 2 shows side wall units of the grazing yard according to one embodiment of the present invention;

FIG. 3 shows base units of the grazing yard according to a preferred embodiment of the present invention.

DETAILED DESCRIPTION OF PREFERRED EMBODIMENTS

Figure 4:
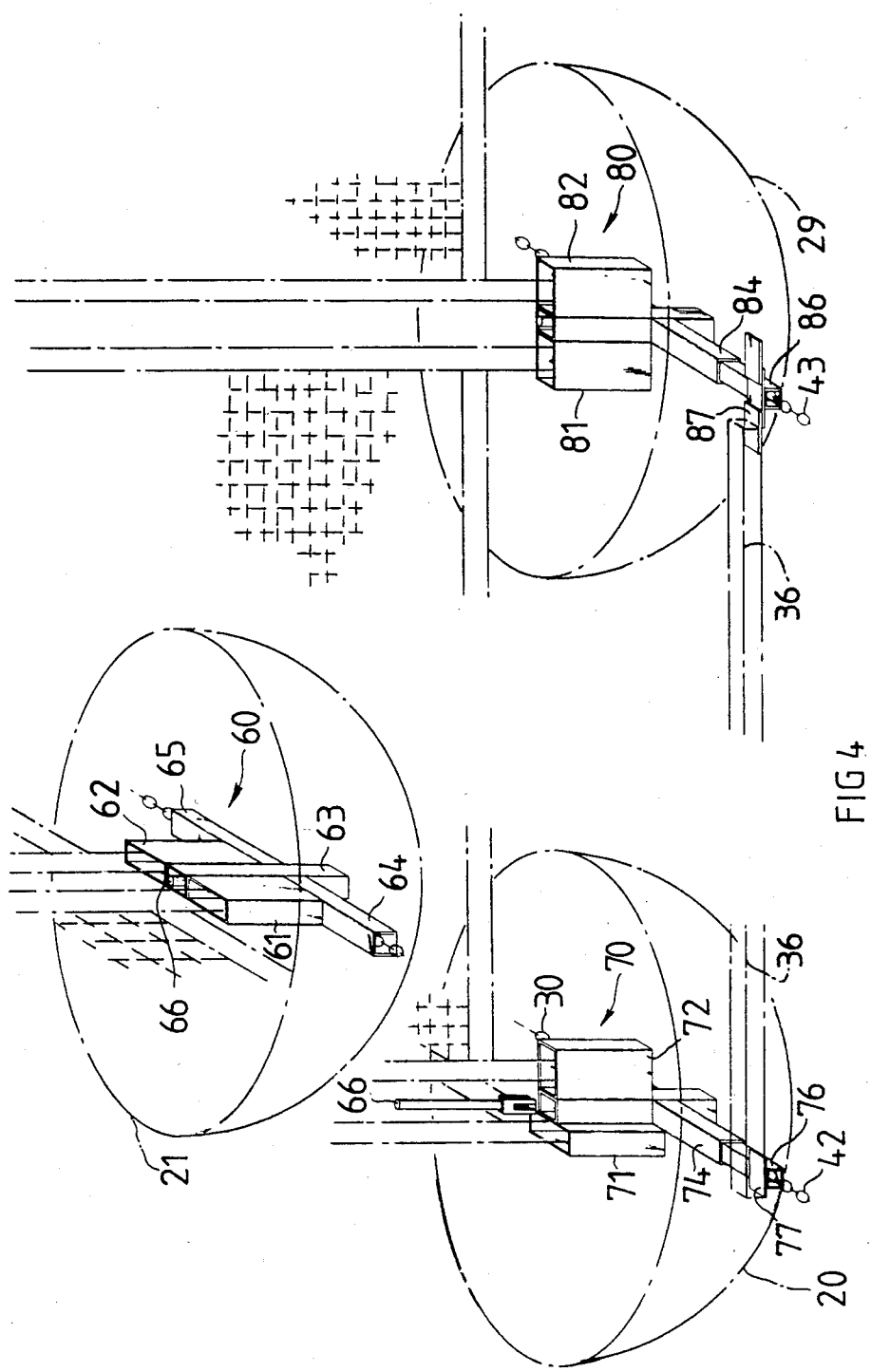
FIG. 4 shows the recess or slots arrangement of the base units according to a preferred embodiment of the present invention.

Referring to FIG. 1, there is shown a grazing yard according to the present invention comprising a plurality of wall units 10–19 and a further plurality of base units 20–29. Base units 20, 21 are associated with wall unit 11, base units 21, 22 are associated with wall unit 12 and so on.

The grazing yard is assembled by placing the leg members of each wall unit so that they are received in corresponding slots in the base units. The wall units are maintained in a substantially vertical position by the base units.

Base units 20–23 and 25–28 are interconnected via respective chain elements 30–32 and 33–35 to reduce stress on wall units 11–13 and 16–18 during relocation. Chain elements 30–32 and 33–35, comprise single lengths of chain secured at the base units. Base units 20, 29, 28 and 23, 24, 25 are interconnected via rigid timber members 36, 37 and 38, 39. A pair of corner water troughs 40, 41 are fitted over horizontal elements associated with wall units pairs 13, 14 and 15, 16 respectively.

When it is desired to relocate the grazing yard, towing chains 42-44 are attached to base units 20, 29, 28. Chains 42-44 are then linked to a tractor and the whole grazing yard is advanced to a new grazing position.

Integrity of the grazing yard may be further improved especially during towing, by providing a chain link between base units 24 and 29. Chain 43 may be kept a little longer so that base units 20 and 28 can be towed a little in advance of base unit 29.

Referring to FIG. 2, the wall unit shown generally at 12 comprises: a frame including an inverted U-shaped member 50, a pair or vertical elements 51, 52 and a horizontal element 53. Inverted member 50 includes a pair of leg members 54, 55. The frame comprises welded square section tubular steel elements. A barrier element comprising steel mesh 56 is attached to the frame member by spot welding.

FIG. 3 shows a pair of circular base units 21, 22 in plan view. The base units include respective recesses 57, 58. Recesses 57, 58 are adapted to receive leg member pairs 54, 59 and 55, 60 respectively of adjacent wall units. Base units 21, 22 comprise pre-cast concrete units. The lower portions of base units 20, 21 are gently rounded as shown. The base units 21, 22 are interconnected via chain element 31 to reduce strain on the wall units during towing.

Further chain or similar linking elements, of which chain element 69 is typical, may be connected between chains (31) linking the base units (21, 22) and a lower portion (53) of corresponding wall units. The further chain elements are located adjacent the leading ends of the base units to cause at least partial lift of the leading ends thereof to assist movement of the base units during towing.

FIG. 4 shows a detailed view of slot arrangements in corner base units 20, 21, 29 shown in FIG. 1. The slot arrangement in base unit 21, for example comprises an insert 60 which is embedded in the concrete base unit. Insert 60 includes extremities which communicate with the external surface of base unit 21.

Insert 60 includes rectangular tubular elements 61, 62 which communicate with the top surface of base unit 62. Tubular elements 61, 62 receive leg members of wall units 11, 12. Tubular elements 61, 62 are spaced by a substantially square tubular element 63. Insert 60 includes horizontal tubular elements 64, 65 which communicate with the curved surface of base unit 21. Tubular elements 64, 65 are arranged to communicate with each other via suitable openings in tubular element 63. Tubular elements 64, 65 are inclined to the horizontal such that the inner ends thereof which communicate with tubular element 63 are elevated above the free ends thereof. This facilitates flushing of the tubular elements should these become polluted. Inclination of tubular elements 64, 65 in the manner described additionally facilitates the abovementioned partial lift of the leading ends of the base units. Flushing of pollution is further facilitated by arranging suitable openings in tubular elements 64, 65 which communicate with tubular elements 61, 62 respectively. Insert 60 is constructed by welding tubular elements 61-65 together as shown.

A chain is introduced into and passes through tubular elements 64, 65. The chain is secured with respect to insert 60 by dropping a fastening element 66 into tubular element 63. Fastening element 66 is bifurcated at one end thereof for engaging links of the chain thereby securing the chain with respect to insert 60.

The slot arrangement in corner base unit 20 comprises insert 70. Insert 70 differs from insert 60 primarily in the right angle orientation of the long side walls of tubular elements, 71, 72. It will be appreciated that other arrangements of tubular elements 70, 71 are possible whilst retaining the right angle relationship between the long side walls of tubular elements 70, 71.

Horizontal tubular elements 74, 84 of inserts 70, 80 respectively, slidably receive tubular elements 76, 86 therein. Tubular elements 76, 86 include plate members 77, 87 thereon to which is secured rigid beam 36.

It will be appreciated that various modifications and/or alterations may be introduced into the construction and arrangements of parts previously described without departing from the spirit or ambit of the present invention.

Having now described our invention, what we claim as new and desire to secure By Letters Patent is:

1. In a relocatable grazing enclosure comprising a plurality of wall units and an associated plurality of base units linked together to define the periphery of said enclosure, the combination comprising:
   a wall unit including a frame member supporting a barrier element, said wall unit being adapted to prevent passage of grazing animals through said wall unit; said frame member having at least on leg member; and
   at least one base unit adapted to maintain said wall unit in an upright position and having at least one recess adapted to receive a leg member of said frame member, said base unit having a rounded ground contacting surface and means adapted for linking like base units together to facilitate movement of the base units, and concomitantly an assembled grazing enclosure, across a pasture as a unitary structure.

2. A combination according to claim 1, including linking means adapted to lift a leading end of the or each base unit to facilitate said movement.

3. A combination according to claim 1, wherein said frame member comprises at least a pair of vertical elements and at least one horizontal element.

4. A combination according to claim 3 wherein each vertical element forms a leg member.

5. A combination according to claim 1 wherein each base unit comprises a substantially semi-spherical concrete mass.

6. A combination according to claim 5 wherein said base unit recess is provided by means of an insert embedded in said concrete mass.

7. A combination according to claim 6 wherein said insert is embedded just below a top surface of said mass and provides first and second recesses communicating with said top surface for receiving respective leg members of adjacent wall 8. A combination according to claim 6 wherein said insert additionally provides a substantially horizontal bore in said mass for receiving a chain therethrough.

9. A combination according to claim 8 wherein said insert provides a third recess communicating with said bore for receiving a fastening element.

10. A combination according to claim 1 wherein:
   (a) said base unit rounded ground contacting surface is adapted for facilitating movement along an engaged ground surface at least in forward and rearward directions.

11. A combination according to claim 10 including linking means adapted to lift a leading end of the or each base unit to facilitate said movement.

12. A combination according to claim 10 wherein said frame member comprises at least a pair of vertical elements and at least one horizontal element.

13. A combination according to claim 12 wherein each vertical element forms a leg member.

14. A combination according to claim 10 wherein each base unit comprises a substantially semi-spherical concrete mass.

15. A combination according to claim 14 wherein said base unit recess is provided by means of an insert embedded in said concrete mass.

16. A combination according to claim 15 wherein said insert is embedded just below a top surface of said mass and provides first and second recesses communicating with said top surface for receiving respective leg members of adjacent wall units.

17. A combination according to claim 15 wherein said insert additionally provides a substantially horizontal bore in said mass for receiving a chain therethrough.

18. A combination according to claim 17 wherein said insert provides a third recess communicating with said bore for receiving a fastening element.

19. A combination according to claim 10 wherein said base unit rounded ground contacting surface facilitates movement along said ground surface in any lateral direction.

20. A relocatable grazing enclosure comprising a plurality of wall units and an associated plurality of base units adapted to maintain said wall units in an upright position and linked together to define the periphery of said enclosure therein:

each wall unit includes a frame member supporting a barrier element adapted to prevent passage of grazing animals therethrough; each frame member having at least one leg member; and each base unit includes a recess receiving a leg member of a frame member and has a rounded ground contacting surface and means linking like base units together to facilitate movement of said enclosure across a pasture as a unitary structure.

21. A relocatable enclosure according to claim 20 wherein said linking means is adapted to lift leading ends of the base units during movement of said enclosure to facilitate said movement.

22. A relocatable enclosure according to claim 20 wherein at least some of said base units are linked by means of one or more chains.

23. A relocatable enclosure according to claim 20 wherein at least some of said base units are linked by means of one or more rigid members.

24. A relocatable grazing enclosure comprising a plurality of wall units and an associated plurality of base units adapted to maintain said wall units in an upright position and linked together to define the periphery of said enclosure therein:

each wall unit includes a frame member supporting a barrier element adapted to prevent passage of grazing animals therethrough; each frame member having at least one leg member; and, each base unit includes a recess receiving a leg member of a frame member and has a rounded ground contacting surface adapted for facilitating movement along an engaged ground surface at least in forward and rearward directions, and means linking like base unit together to facilitate movement of said enclosure across a pasture as a unitary structure.

25. A relocatable enclosure according to claim 24 wherein said linking means is adapted to lift leading ends of the base units during movement of said enclosure to facilitate said movement.

26. A relocatable enclosure according to claim 24 wherein at least some of said base units are linked by means of one or more chains.

27. A relocatable enclosure according to claim 24 wherein at least some of said base units are linked by means of one or more rigid members.

* * * * *

UNITED STATES PATENT AND TRADEMARK OFFICE
CERTIFICATE OF CORRECTION

PATENT NO. : 4,787,603

DATED : November 29, 1988

INVENTOR(S) : Clive N. Norton

It is certified that error appears in the above-identified patent and that said Letters Patent is hereby corrected as shown below:

Column 6, line 27, "on" should be --one--.

Column 6, line 55, after "wall" insert --units.--.

Column 8, line 27, delete "unit" and insert therefor --units--.

Signed and Sealed this

Twenty-sixth Day of December, 1989

Attest:

JEFFREY M. SAMUELS

Attesting Officer     Acting Commissioner of Patents and Trademarks